US009262873B2

(12) United States Patent
Raghunathan et al.

(10) Patent No.: US 9,262,873 B2
(45) Date of Patent: Feb. 16, 2016

(54) SYSTEMS AND METHODS FOR PROCESSING VEHICLE DATA TO REPORT PERFORMANCE DATA INTERCHANGEABLY

(71) Applicant: Omnitracs, LLC, San Diego, CA (US)

(72) Inventors: Sudarshan Raghunathan, San Diego, CA (US); Chung Hung Lee, San Diego, CA (US); Jeffrey McQuigg, San Diego, CA (US)

(73) Assignee: Omnitracs, LLC, Dallas, TX (US)

( * ) Notice: Subject to any disclaimer, the term of this patent is extended or adjusted under 35 U.S.C. 154(b) by 341 days.

(21) Appl. No.: 13/623,613

(22) Filed: Sep. 20, 2012

(65) Prior Publication Data

US 2013/0079971 A1 Mar. 28, 2013

Related U.S. Application Data

(60) Provisional application No. 61/538,712, filed on Sep. 23, 2011.

(51) Int. Cl.

| | |
|---|---|
| ***G06F 17/00*** | (2006.01) |
| ***G07C 5/00*** | (2006.01) |
| *G07C 5/08* | (2006.01) |

(52) U.S. Cl.

CPC . *G07C 5/008* (2013.01); *G07C 5/08* (2013.01)

(58) Field of Classification Search

CPC ............ G07C 5/00; G07C 5/008; G07C 5/02; G07C 5/06; G07C 5/08; G07C 5/0816; G07C 5/0825; G07C 5/0841; G07C 5/12; G06Q 10/0639; G06Q 10/06398; G08G 1/20

USPC ........... 701/31.4, 29.1, 31.6, 32.1, 29.4, 31.5, 701/22, 117, 29.3, 29.6, 32.5, 32.6, 32.9, 701/33.4, 33.6, 34.4, 482; 340/438, 853.2, 340/426.36; 709/230; 345/440; 705/7.38, 705/7.39

See application file for complete search history.

(56) References Cited

U.S. PATENT DOCUMENTS

| | | | | |
|---|---|---|---|---|
| 4,247,757 | A | 1/1981 | Crump, Jr. | |
| 6,339,745 | B1 * | 1/2002 | Novik | G08G 1/123 342/357.31 |
| 6,505,106 | B1 * | 1/2003 | Lawrence | G01M 15/05 342/357.31 |
| 6,526,341 | B1 * | 2/2003 | Bird | G07C 5/008 340/573.1 |

(Continued)

FOREIGN PATENT DOCUMENTS

WO 2009125178 A2 10/2009

OTHER PUBLICATIONS

International Search Report and Written Opinion—PCT/US2012/056715—ISA/EPO—Jan. 7, 2013.

*Primary Examiner* — Thomas G Black
*Assistant Examiner* — Sara Lewandroski
(74) *Attorney, Agent, or Firm* — Arent Fox LLP

(57) ABSTRACT

Systems and methods to process vehicle operation data are described. A data module associated with a vehicle can collect a set of metrics relating to the operation of the vehicle, as well as events related to an operator's interaction with the vehicle. The data module can correlate the set of metrics with the events to generate a correlated set of data. A user can request various contexts in which to view the data, such as via a vehicle context or an operator context. The data module can generate, using the correlated set of data, a data view according to the request. Further, the correlated set of data and the various contexts can be updated on a real-time basis.

25 Claims, 6 Drawing Sheets

(56) References Cited

U.S. PATENT DOCUMENTS

| | | | | |
|---|---|---|---|---|
| 6,853,894 | B1 * | 2/2005 | Kolls | 701/31.4 |
| 6,931,309 | B2 * | 8/2005 | Phelan | G01M 17/00 340/439 |
| 7,715,961 | B1 | 5/2010 | Kargupta | |
| 7,788,002 | B2 * | 8/2010 | Yukawa et al. | 701/31.4 |
| 7,899,591 | B2 | 3/2011 | Shah et al. | |
| 8,095,261 | B2 * | 1/2012 | Howell et al. | 701/29.1 |
| 8,239,094 | B2 * | 8/2012 | Underdal et al. | 701/29.4 |
| 8,301,330 | B2 * | 10/2012 | Nielsen | 701/29.1 |
| 8,412,402 | B2 * | 4/2013 | Underdal et al. | 701/29.1 |
| 8,423,226 | B2 * | 4/2013 | Underdal et al. | 701/31.4 |
| 8,428,813 | B2 * | 4/2013 | Gilbert | 701/31.4 |
| 8,433,472 | B2 * | 4/2013 | Singh et al. | 701/31.4 |
| 8,660,738 | B2 * | 2/2014 | Faivre et al. | 701/29.1 |
| 8,686,844 | B1 * | 4/2014 | Wine | G08G 1/20 340/438 |
| 2007/0203637 | A1 * | 8/2007 | Passman | G06Q 10/06 701/117 |
| 2008/0154691 | A1 * | 6/2008 | Wellman | G05D 1/0282 705/7.26 |
| 2009/0287369 | A1 * | 11/2009 | Nielsen | 701/33 |
| 2010/0087984 | A1 | 4/2010 | Joseph | |
| 2010/0179844 | A1 * | 7/2010 | LaFergola et al. | 705/7 |
| 2011/0012720 | A1 | 1/2011 | Hirschfeld | |
| 2011/0040440 | A1 * | 2/2011 | de Oliveira | G06Q 10/06 701/29.5 |
| 2011/0130960 | A1 * | 6/2011 | Sheha | G01C 21/36 701/533 |
| 2011/0144839 | A1 * | 6/2011 | Pudar | 701/22 |
| 2012/0065834 | A1 * | 3/2012 | Senart et al. | 701/31.4 |
| 2012/0239462 | A1 * | 9/2012 | Pursell | G07C 5/085 705/7.38 |
| 2012/0246039 | A1 * | 9/2012 | Fain | G06Q 10/08 705/32 |
| 2012/0253587 | A1 * | 10/2012 | Davidson | G06Q 10/08 701/29.3 |
| 2013/0006715 | A1 * | 1/2013 | Warkentin | G06Q 10/0639 705/7.38 |
| 2014/0052672 | A1 * | 2/2014 | Wagner | G06Q 10/06398 705/500 |
| 2014/0195310 | A1 * | 7/2014 | McQuade | G06Q 10/06393 705/7.39 |
| 2014/0303833 | A1 * | 10/2014 | Phelan | G06Q 40/00 701/31.5 |
| 2015/0081162 | A1 * | 3/2015 | Mitchell | B60W 40/09 701/32.4 |

* cited by examiner

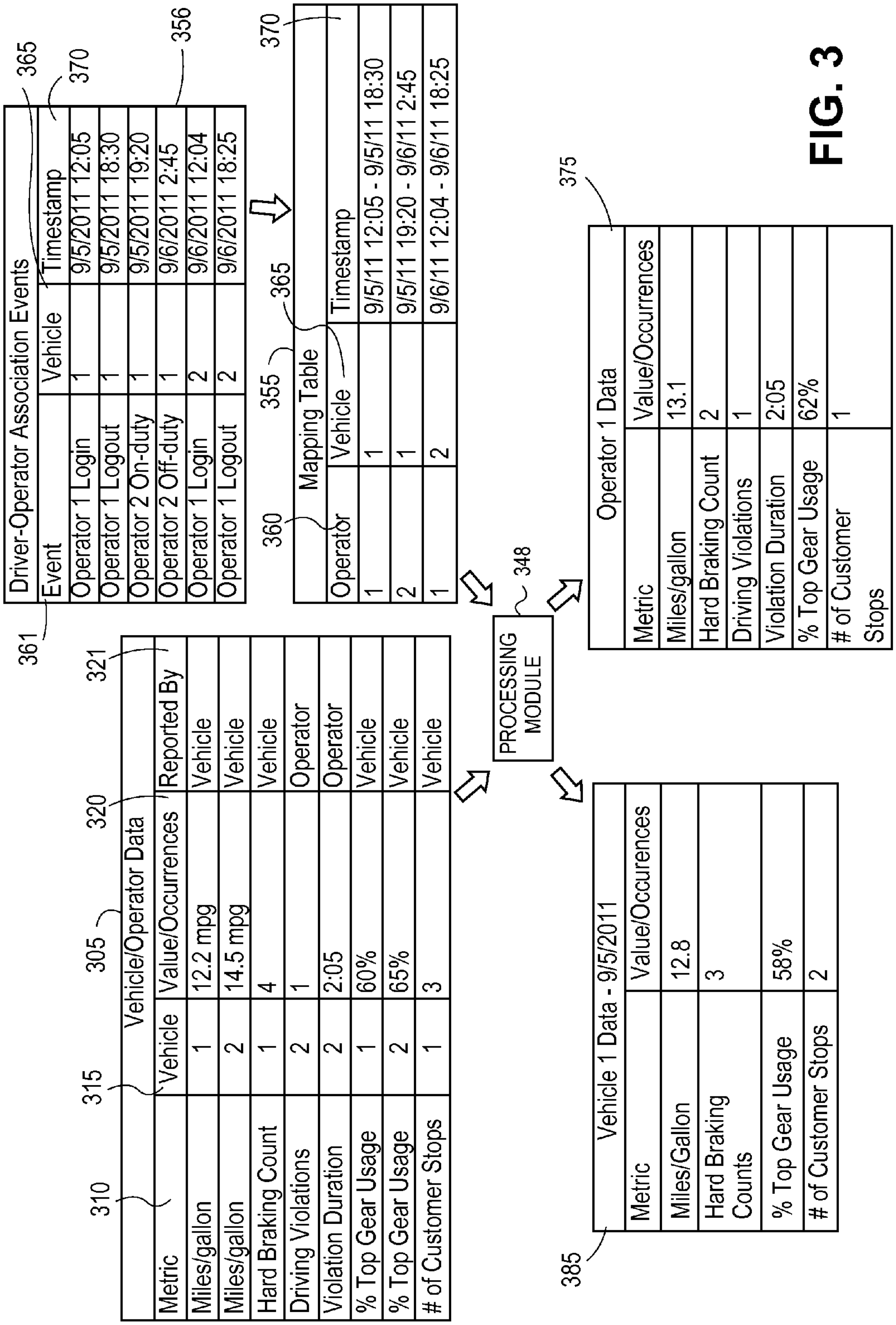

Driver-Operator Association Events

| Event | Vehicle | Timestamp |
|---|---|---|
| Operator 1 Login | 1 | 9/5/2011 12:05 |
| Operator 1 Logout | 1 | 9/5/2011 18:30 |
| Operator 2 On-duty | 1 | 9/5/2011 19:20 |
| Operator 2 Off-duty | 1 | 9/6/2011 2:45 |
| Operator 1 Login | 2 | 9/6/2011 12:04 |
| Operator 1 Logout | 2 | 9/6/2011 18:25 |

Mapping Table

| Operator | Vehicle | Timestamp |
|---|---|---|
| 1 | 1 | 9/5/11 12:05 - 9/5/11 18:30 |
| 2 | 1 | 9/5/11 19:20 - 9/6/11 2:45 |
| 1 | 2 | 9/6/11 12:04 - 9/6/11 18:25 |

Vehicle/Operator Data

| Metric | Vehicle | Value/Occurrences | Reported By |
|---|---|---|---|
| Miles/gallon | 1 | 12.2 mpg | Vehicle |
| Miles/gallon | 2 | 14.5 mpg | Vehicle |
| Hard Braking Count | 1 | 4 | Vehicle |
| Driving Violations | 2 | 1 | Operator |
| Violation Duration | 2 | 2:05 | Operator |
| % Top Gear Usage | 1 | 60% | Vehicle |
| % Top Gear Usage | 2 | 65% | Vehicle |
| # of Customer Stops | 1 | 3 | Vehicle |

Operator 1 Data

| Metric | Value/Occurrences |
|---|---|
| Miles/gallon | 13.1 |
| Hard Braking Count | 2 |
| Driving Violations | 1 |
| Violation Duration | 2:05 |
| % Top Gear Usage | 62% |
| # of Customer Stops | 1 |

Vehicle 1 Data - 9/5/2011

| Metric | Value/Occurences |
|---|---|
| Miles/Gallon | 12.8 |
| Hard Braking Counts | 3 |
| % Top Gear Usage | 58% |
| # of Customer Stops | 2 |

FIG. 3

SYSTEMS AND METHODS FOR PROCESSING VEHICLE DATA TO REPORT PERFORMANCE DATA INTERCHANGEABLY

CLAIM OF PRIORITY UNDER 35 U.S.C. §119

The present Application for Patent claims priority to Provisional Application No. 61/538,712 entitled "SYSTEMS AND METHODS FOR PROCESSING VEHICLE DATA TO REPORT PERFORMANCE DATA INTERCHANGEABLY", filed Sep. 23, 2011, and assigned to the assignee hereof and hereby expressly incorporated by reference herein.

BACKGROUND

Vehicle fleet managers or administrators manage several drivers and units of equipment when overseeing operation of the vehicles of the fleet. For example, the fleet can have several trucks that can be driven, interchangeably, by several drivers or operators. Systems and modules associated with the vehicles can sense and record observations related to safety, compliance, fuel efficiency, location, and other metrics. The observations and data can be collected by in-cab units or computing systems. Further, the vehicle fleet managers or administrators can use the data to manage the fleet, schedule drivers, schedule vehicle maintenance, and perform other tasks.

However, current systems and methods only report the observations and data in the context of a single entity, such as an operator or a vehicle. For example, safety- or fuel-related event observations are associated with vehicles, while compliance-related information is associated with drivers. The current systems cannot switch contexts and view the event observations organized by drivers or vehicles, interchangeably. Therefore, more complex data processing is necessary to correlate the data. Further, the current systems cannot organize the multi-context data on a real-time basis.

A need therefore exists for systems and methods for associating operator- and vehicle-related data. More particularly, a need exists for platforms and techniques for reporting performance data interchangeably by associating operator- and vehicle-related data on a real-time basis.

SUMMARY

Implementations are directed to systems and methods for processing data associated with a vehicle. According to implementations in one regard, a set of metrics related to a performance of the vehicle is collected. In operation, an event associating an operator of the vehicle with the vehicle is detected. Various implementations further relate to correlating the set of metrics with the event to generate a correlated set of data and providing the correlated set of data to a user.

BRIEF DESCRIPTION OF THE DRAWINGS

The accompanying drawings, which are incorporated in and constitute a part of this specification, illustrate implementations of the present disclosure and together with the description, serve to explain the implementations.

FIG. 3 comprises exemplary charts comprising contexts of vehicle and operator data according to various implementations.

DETAILED DESCRIPTION

Figure 1:
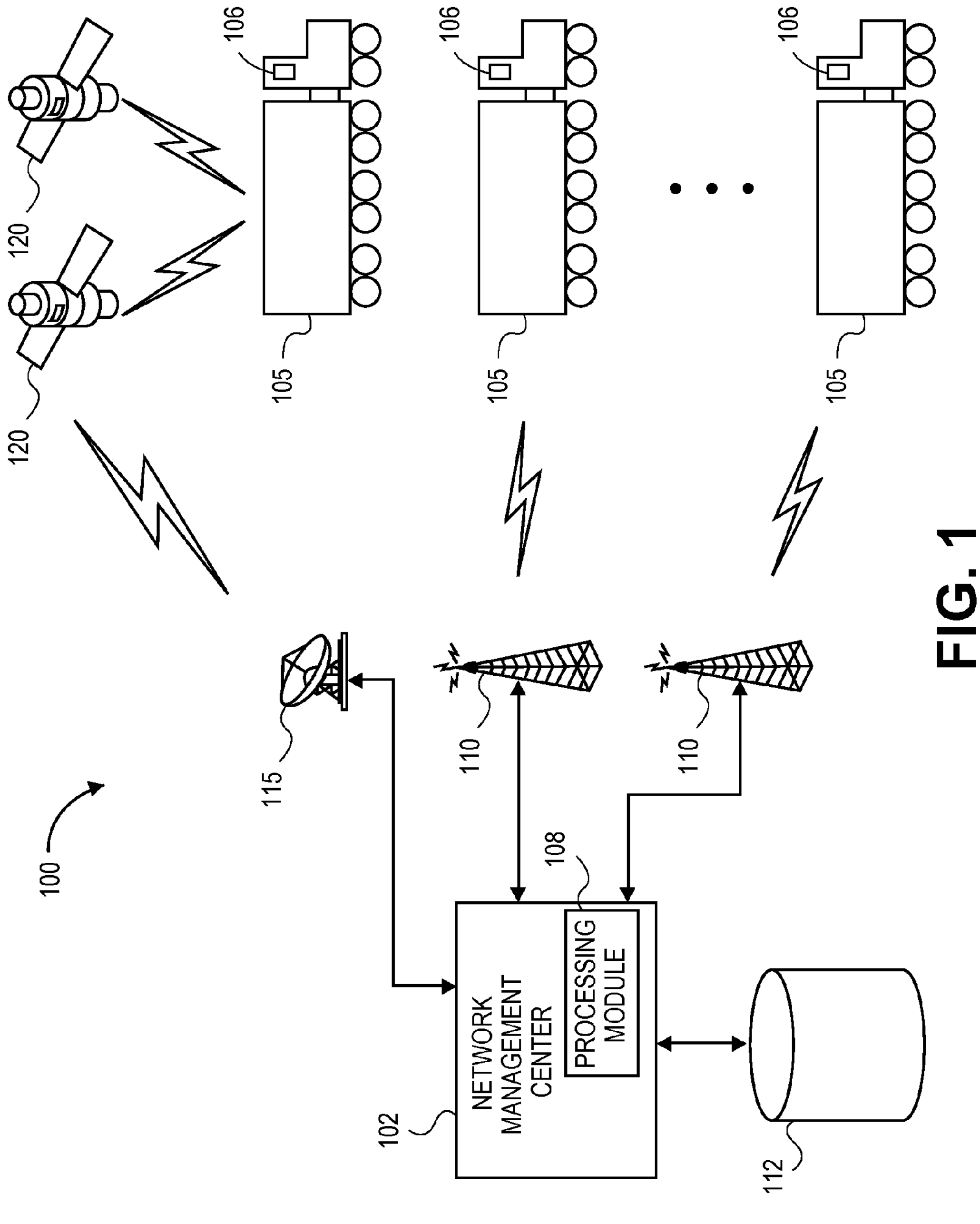
FIG. 1 illustrates a functional block diagram of an exemplary data processing system according to various implementations.

Implementations are directed towards systems and methods for processing vehicle operation data. In particular, the systems and methods can generate and switch contexts of data associated with vehicles and operators. The systems and methods can allow vehicle managers, administrators, or operators to adjust driving schedules, assignments, or general operation techniques in response to data processing results. The systems and methods according to the present teachings can be implemented as software or hardware on new or existing devices, and/or on new or existing management servers, applications, or other resources.

Vehicles as described herein can be understood to be any type of truck, car, motorcycle, scooter, or any other mobile unit configured with a gas, hybrid-type, or electric engine. Further, as described herein, the "SensorTRACS" application available from Qualcomm® Inc. can refer to an application or interface operating on a vehicle on which a vehicle operator can register, log in, log out, and perform various operations and calculations. Further, the SensorTRACS application can collect, analyze, and transmit data associated with operation of the vehicle. It should be appreciated to a person having ordinary skill in the art that the implementations and functions of the systems and methods as described herein can be performed by any application, process, module, and/or the like. For example, an operator login application can detect and record login/logout events as well as duty status events (e.g. on duty or off duty), and an hours of service application can record a number of hours that an operator drives a vehicle. The applications, process, modules, and/or the like can be a component of vehicles and/or back-end systems. For example, the Performance Monitoring Application, Critical Event Reporter, Hours of Service Application, Vehicle Maintenance Application, and Geoservices Application available from Qualcomm® Inc. can be some of the applications or modules implemented in the systems and methods as described herein.

Further, as described herein, "driver-related data" or "operator-related data" can refer to data relating to a driver's operation of a vehicle. For instance, the following data metrics can be examples of operator-related data: operator login/logout events and operator duty status changes; operator safety information such as hard braking count, lane departure count, roll stability count, miles driven, and overall safety score; operator compliance information (e.g. data that can be computed based on rules or laws in various jurisdictions) such as driving violations, violation duration, count and duration of on-duty violations, count and duration of cumulative violations, count and duration of off-duty violations, and overall compliance score; fuel-related metrics such as percentage over rev, percentage of total idle time, percentage over speed, fuel efficiency (miles/gallon (MPG)), percentage of top gear usage, percentage of cruise control usage, and overall fuel score; operator efficiency metrics such as average number of customer stops, average number of exceeded stoppage time stops, average exceeded stoppage time, exclusion zone violations, and overall efficiency score; composite operator rating score; daily trending information on various categories; fatigue correlation (e.g. safety events by time of day, and others); and other metrics.

Further, as described herein, "vehicle-related data" can refer to data relating to a vehicle's operation. More particularly, the vehicle-related data can be represented from a vehicle perspective in real-time or over time, and irrespective of any operators that may have been associated with a particular vehicle over a duration of time. Further, the operator-related data, as referenced herein, can be processed as vehicle-related data when represented from a vehicle perspective. For example, the MPG metric processed for a specific vehicle over a set duration can be described as "vehicle-related data." Further, the following data metrics can be further examples of vehicle-related data: attributes such as customer-assigned vehicle IDs and vehicle maintenance information, and GPS coordinates and locations associated with vehicles (e.g. a granular stream of positions with latitude/longitude, odometer reading, speed, ignition status, and others). It should be appreciated that other operator- and vehicle-related data metrics are envisioned.

According to implementations, a module coupled to the vehicle can be configured to collect the operator- and vehicle-related data. The module can process the data to generate operator- and vehicle-centered contexts that can be viewed, interchanged, manipulated, and/or otherwise accessed. In implementations, the vehicle module can provide the metrics and/or processed data to a remote management center, server, and/or the like, via one or more networks. The remote management center can be configured to process any data received from the vehicle module, generate associated reports, interfaces, and/or contexts, and provide processed or generated data to a user, administrator, vehicle operator, and/or the like.

Reference will now be made in detail to exemplary implementations of the disclosure, an example of which is illustrated in the accompanying drawings. Wherever possible, the same reference names and numbers will be used throughout the drawings to refer to the same or like parts.

In the following description, reference is made to the accompanying drawings that form a part thereof, and in which is shown by way of illustration-specific exemplary implementations. These implementations are described in sufficient detail to enable those skilled in the art to practice the implementations, and it is to be understood that other implementations can be used and that changes can be made without departing from the scope of this disclosure. The following description is, therefore, merely exemplary.

FIG. 1 illustrates a block diagram of an exemplary data processing system 100 consistent with various implementations. As shown in FIG. 1, system 100 can comprise a network management center 102 configured to communicate with one or more vehicles 105. In implementations, each of the vehicles 105 can comprise a data module 106 configured to collect and transmit data associated with the operation of the vehicles 105 and/or the operators of the vehicles 105. For example, the data module 106 can be an in-cab mobile unit, an on-board computing system, or other hardware or software resources. In implementations, the data module 106 can be configured to perform calculations and execute applications associated with any of the data collected. Further, in implementations, the data module 106 can be configured with a repository (not shown in figures) configured to store any data associated with the data module 106.

The network management center 102 can be configured to communicate with the data module 106 of the vehicles 105 via one or more networks. As shown in FIG. 1, the network can be a satellite dish 115 operating with one or more satellites 120. In implementations, the data module 106 can use a modem or other communication device to communicate with the satellites 120, which can relay the data to the satellite dish 115 at a ground station. Further, as shown in FIG. 1, the network can comprise one or more base stations 110 configured to facilitate data communication among the vehicles 105 and the network management center 102. For example, the base stations 110 can be configured to connect to a modem or other communication device of the data module 106 via any number of wireless data systems and methods (e.g. GSM, CDMA, TDMA, WCDMA, EDGE, OFDM, GPRS, EV-DO, WiFi, Bluetooth, WiMAX, UWB, PAN, and others). In implementations, the satellite dish 115 and the base stations 110 can be configured to connect to the network management center 102 locally or remotely via wired or wireless connections. Further, in implementations, lower-bandwidth data can be sent via the satellites 120 and higher-bandwidth data can be sent via the base stations 110. It should be appreciated that the satellites 120, base stations 110, and satellite dish 115 can use any data network to direct the communication of any amount of data from the data module 106 to the network management center 102, and vice-versa.

In implementations, the data module 106 of the vehicles 105, or other logic, can be configured to receive operating data associated with the vehicles 105. For example, the data module 106 can be configured to collect any location-based or operational-based data associated with the vehicles 105 such as, for example, a hard braking event, a fuel efficiency, an exclusion zone violation, and other data. Further, the data module 106 can be configured to maintain a history of operating data. For example, the data module 106 can record the number of lane departure counts that an operator tallies over a set period of time. For further example, the data module 106 can record the number of roll stability counts that occur on a vehicle over a set period of time, regardless of who is driving the vehicle.

In implementations, the operating data can be sensed by one or more sensors positioned on or otherwise coupled to one or more components of the vehicles 105. For example, a sensor can be coupled to an engine of the vehicles 105, or other components, and configured to sense the gear in which the vehicles 105 are operating. It should be appreciated that other sensors or data gathering devices configured to sense operation data can be placed or positioned on any part of the one or more vehicles 105. For example, the devices can be configured to sense or detect a driving violation, such as a speeding violation, lane violation, or other violation.

According to implementations, the data module 106 can be configured to sense and/or process login and logout events associated with the driver or operator of the vehicle, as well as operator duty status changes. For example, the vehicle operator can sign in or log in to the SensorTRACS application available from Qualcomm® Inc, and the operating data of the vehicle can be collected and/or processed when the vehicle operator is logged into the application. For further example, the operator can update his or her duty status (e.g., on-duty or off-duty) via an application or module on board the vehicle 105. It should be understood than an operator need not be logged into a module or application in order to update his or her duty status. Similarly, an operator can be logged into a module or application but need not be on duty. By examining the login/logout and the duty status change activity, the operating data can be associated with particular operators who drive any of the vehicles 105. For example, if multiple operators drive the same vehicle over a specified time period, then the login and logout activity of the operators can be used to determine which operators are associated with which operating data, or other metrics.

The data modules 106 of the vehicles 105 can be configured to compile and calculate metrics associated with the operating data, or other data. For example, the data modules 106 can be configured to aggregate operating data collected at different points during operation of the vehicles 105. For further example, the data modules 106 can be configured to aggregate a number of hard braking counts, a number of driving violations, a number of customer stops, and other data that can be associated with operation of a vehicle. In implementations, the data modules 106 can be configured to provide or otherwise transmit the data from the sensors, or any aggregated or calculated data, to the network management center 102 via the base stations 110, the satellite dish 115, the satellites 120, or any combination thereof, as discussed herein.

The network management center 102 can be configured to receive data from one or more of the data modules 106 via the base stations 110, the satellite dish 115, the satellites 120, or any combination thereof. In implementations, the network management center 102 can be configured with a processing module 108 that can compile or perform calculations or processing on data received from the data modules 106. For example, the processing module 108 can receive raw data collected by the sensors of the vehicles 105 and can compile the raw data into vehicle- or operator-related contexts. For further example, the processing module 108 can receive data that was previously processed or calculated by the data modules 106 of the vehicles 105.

Figure 2:
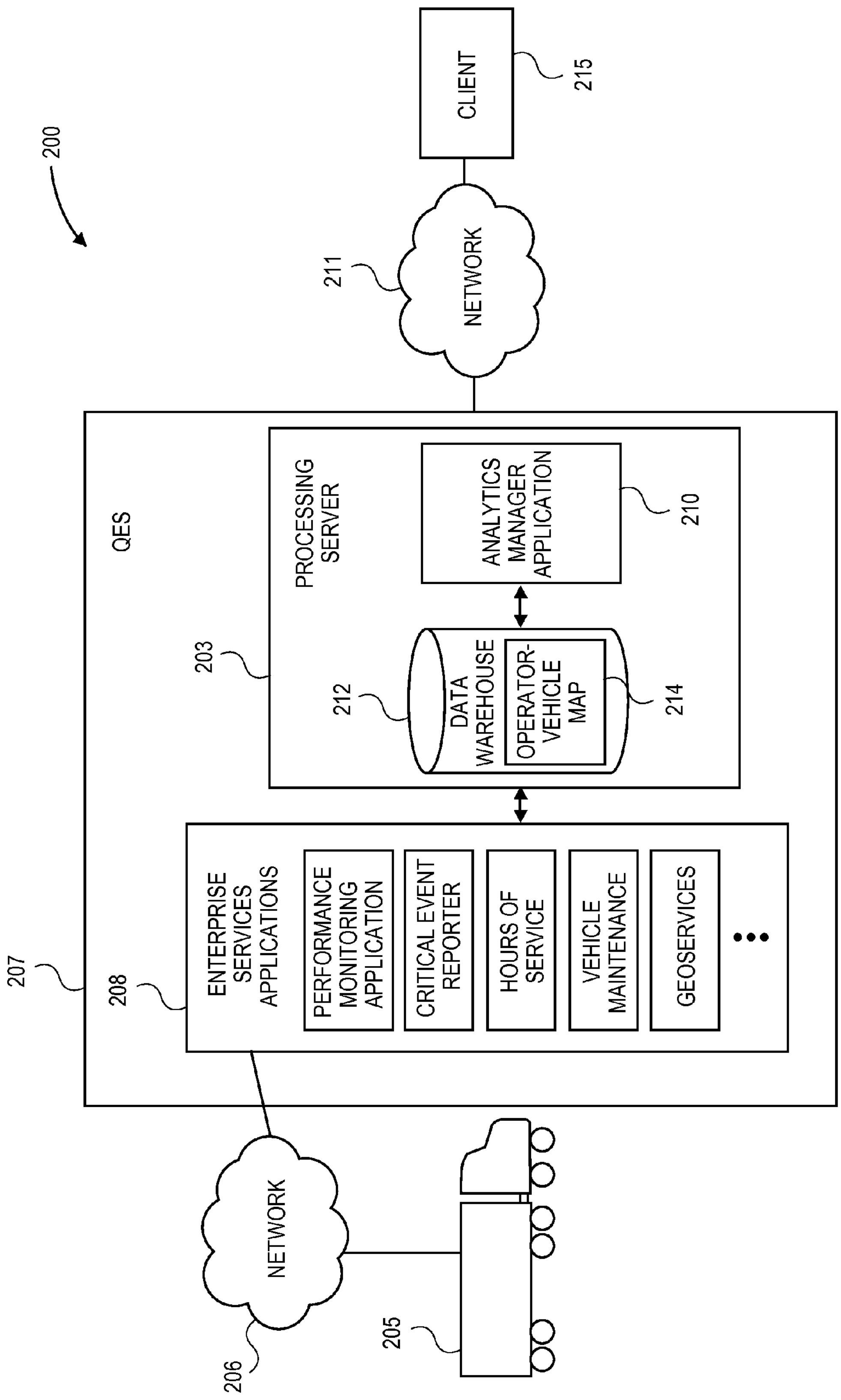
FIG. 2 illustrates a detailed functional block diagram of an exemplary data processing system according to various implementations.

FIG. 2 illustrates an exemplary environment 200 consistent with various implementations. In particular, the environment comprises a vehicle 205 and an enterprise services system 207. For example, the enterprise services system 207 can be the system configured to execute the Qualcomm® Enterprise Services. The enterprise services system 2077 can comprise a set of enterprise services applications 208. For example, the set of enterprise services applications 208 can comprise those associated with Qualcomm® Enterprise Services such as, for example, performance monitoring application, critical event reporter, house of service application, vehicle maintenance application, and geoservices. It should be appreciated to a person having ordinary skill in the art that services and applications as shown in FIG. 2 are not exhaustive, and that other services and applications are envisioned.

As shown in FIG. 2, the vehicle 205 can be configured to connect to the enterprise services system 207 via any type of data or network connection (e.g., a network 206). In operation, the set of enterprise services applications 208 can receive operation, performance, and/or event data from the vehicle 205 and process the received data according to the specific application. For example, the hours of service application can detect login/logout events, as well as duty status changes (e.g., on-duty or off-duty), and process the events and duty status changes to determine operation data associated with the vehicle 205. For further example, the critical event reporter can detect critical events in the received data, and can process the data to generate a log of the associated critical events.

The set of enterprise services applications 208 can be configured to connect to a processing server 203 comprising a data warehouse 212 and an analytics manager application 210. In particular, the set of enterprise services applications 208 can provide any operation data received from the vehicle 205 and/or any data processed by the set of enterprise services applications 208 to the data warehouse 212 for storage as part of an operator-vehicle map 214. For example, the operator-vehicle map 214 can be a mapping table or other type of data structure that can store operator login/logout events, duty status change events, and other change events, associated with the operation of the vehicle 205. For further example, the operator-vehicle map 214 can store indications of safety, compliance, fuel, efficiency, and other events, from the performance monitoring application, and/or other applications. In particular, if an operator of the vehicle 205 brakes hard, then an indication of the hard braking event can be sent to the operator-vehicle map 214 via the set of enterprise services applications 208. Further, if an operator of the vehicle 205 deviates from a route, then an indication of the deviation can be sent to the operator-vehicle map 214 via the set of enterprise services applications 208. It should be appreciated that the data warehouse 212 can receive other data associated with operation of the vehicle 205 for storage in the operator-vehicle map 214.

The analytics manager application 210 can comprise any combination of hardware and/or software resources that are capable of executing applications or processes to gather and/or process any operator- or vehicle-related data, as discussed herein. Further, the analytics manager application 210 can be a part of the processing module 108, as discussed with respect to FIG. 1.

In implementations, the analytics manager application 210 can be configured to access data from the operator-vehicle map 214 and the data warehouse 212, and can be configured to generate and maintain a real-time association between operators and vehicles. More particularly, the events, measurements, and other data that are related to the operation of the vehicle can be uniquely associated with an identifier representing the data module 106 of the appropriate vehicle. For example, the MPG data sensed by sensors of a vehicle can be associated with an identifier of that vehicle. Further, the analytics manager application 210 can generate and maintain a real-time association of operator-related events with a particular vehicle operated by that operator. For example, when an operator logs in to a vehicle, then the analytics manager application 210 can associate that operator with that vehicle, and any subsequent operational data gathered while the operator is logged into the vehicle can also be associated with the operator, as well as with the vehicle.

The analytics manager application 210 can maintain the associations over time and can dynamically change or update the associations based on certain events tracked by the set of enterprise services applications 208 and/or stored in the operator-vehicle map 214. The correlation of time with vehicle events and operator data can allow the analytics manager application 210 and other modules to associate any events and metrics, recorded over a specified time frame, interchangeably between an operator or the vehicle he or she may be driving in that timeframe. Further, as operators move among different vehicles, the performance metrics associated with the operators can "follow" them. More particularly, the driving data for a specific operator can be a compilation of data across each vehicle that the operator has operated.

The analytics manager application 210 can be configured to access data in the operator-vehicle map 214 to perform data processing in accordance with the implementations as discussed herein. More particularly, the analytics manager application 210 can be configured to associate the operator-related event data with the performance metrics and events to create interchangeable contexts of data. For example, one context of data can detail data associated with a specific operator, regardless of which vehicle the operator is operating. Further, another context of data can detail data associated with a specific vehicle, regardless of which operator is driving the vehicle.

Referring to FIG. 2, the environment 200 can further comprise a client 215 that can be configured to connect to the enterprise services system 207 and components thereof via a network 211. In implementations, the client 215 can be part of the network management center 102 as discussed in relation to FIG. 1. The client 215 can be accessed by a user, administrator, owner, fleet manager, or other entity. Further, the analytics manager application 210, or components thereof, can provide data to the client 215 for, for example, reference or reporting purposes. In particular, an administrator can use the client 215 to request data from the analytics manager application 210 and/or the set of enterprise services applications 208, and the analytics manager application 210 and/or the set of enterprise services applications 208 can identify, locate, and provide the appropriate vehicle and operator associations to the client 215.

In implementations, the client 215 can perform adjustments and manipulations of the data received from the analytics manager application 210 and/or the set of enterprise services applications 208. In particular, an administrator can execute applications and/or processes to change a set of data from an operator view to a vehicle view, and vice-versa. Further, for example, when an administrator desires to view his or her fleet's performance by either vehicle or operator dimensions, the analytics manager application 210 or other logic can determine all of the appropriate metrics and data based on the appropriate vehicles and operators. Further, the data views can be generated and viewed for a selected time range, at different levels (e.g. fleet side, group wide, entity wide, and others), and according to other constraints or metrics. Still further, administrators or other entities can switch between views and dimensions of views, as desired. Further, the views can be dynamically updated as more operational data is received, for example from the analytics manager application 210 and/or the set of enterprise services applications 208, or otherwise made available.

Referring to FIG. 3, depicted are exemplary data records or sets comprising data that can be used, calculated, generated, and/or otherwise accessed by the implementations as described herein. It should be appreciated that the exemplary data records are merely exemplary and can comprise different metrics, variables, and values.

Referring to FIG. 3, an exemplary data record 305 comprises vehicle and operator data. More particularly, the data record 305 can comprise data associated with the operation of vehicles by a set of operators. The data record 305 can detail metrics associated with the operation of multiple vehicles over a set time period, through a set route, or other constraints or durations. In implementations, the data record 305 can detail data that is operator-independent. That is, the data of the data record 305 can be based only on a given group of vehicles, regardless of who drove or is driving the vehicles. For example, if two operators drive the same vehicle on a given day, then the data record 305 can comprise combined vehicle data associated with the two operators.

As shown in FIG. 3, the data record 305 can comprise a set of metrics 310 associated with the operation of a vehicle, as well as an indication 315 of which vehicle to which the appropriate metric 310 corresponds. For example, as detailed in the data record 305, an operation each of vehicle 1 and vehicle 2 has an associated miles/gallon metric. In implementations the indication 315 can correspond to a vehicle ID assigned to a specific vehicle. The data record 305 can comprise further metrics, such as, as shown, hard braking counts, driving violations, violation duration, % top gear usage, and number of customer stops. The data record 305 can further comprise a set of values 320 corresponding to the set of metrics 310. For example, the % of top gear usage of vehicle 1 is 60%, and the % of top gear usage of vehicle 2 is 65%. Further, the data record 305 can comprise a "Reported By" column 321, which can provide an indication of which entity is reporting the data. For example, the driving violations and the violation duration metrics are reported by the operator and the other metrics are reported by the vehicle. Although not shown in FIG. 3, the data record 305 can comprise a time component associated with the data contained therein. For example, the data record 305 can indicate that vehicle 1 achieved 12.2 mpg over a 6-hour period on a specific date, and that vehicle 1 achieved a different miles/gallon value on a different date.

Referring to FIG. 3, an exemplary driver-operator association events table 356 comprises a set of events associated with the operation of a set of vehicles. The driver-operator association events table 356 can comprise data that maps the operation of multiple vehicles by multiple operators. In particular, the driver-operator association events table 356 can comprise events associated with an operator's interaction with a specified vehicle. For example, the driver-operator association events table 356 can comprise login and logout events, on-duty and off-duty events, and/or the like, associated with an operator logging into or logging out of a tracking device of a truck, or the operator indicating that he or she is on-duty or off-duty. As shown in FIG. 3, the driver-operator association events table 356 can comprise a set of events 361, a vehicle indication 365, and a set of timestamps 370. For example, the driver-operator association events table 356 indicates that operator 1 logged in to vehicle 1 on Sep. 5, 2011 at 12:05, and that operator 1 logged out of vehicle 1 on Sep. 5, 2011 at 18:30. Further, the driver-operator association events table 356 indicates that operator 2 went on-duty in operating vehicle 2 on Sep. 5, 2001 at 19:20, and that operator 2 went off-duty in operating vehicle 1 on Sep. 6, 2011 at 02:45, and so on.

Referring to FIG. 3, an exemplary mapping table 355 comprises a set of events associated with the operation of a set of vehicles. The mapping table 355 can comprise data that maps the operation of multiple vehicles by multiple operators. In particular, the mapping table 355 can comprise events associated with an operator's interaction with a specified vehicle. For example, the mapping table 355 can comprise data that can be derived from login and logout events, on-duty and off-duty events, and/or the like, associated with an operator logging into or logging out of a tracking device of a truck, or the operator indicating that he or she is on-duty or off-duty. As shown in FIG. 3, the mapping table 355 can comprise an operator indication 360, a vehicle indication 365, and a set of timestamps 370. For example, the mapping table 355 indicates that operator 1 was associated with vehicle 1 from Sep. 5, 2011 at 12:05 until Sep. 5, 2011 at 18:30. Further, the mapping table 355 indicates that operator 2 was associated with vehicle 2 on Sep. 5, 2001 at 19:20 until Sep. 6, 2011 at 02:45, and so on. In implementations the set of timestamps 370 can be derived from the operators logging into/out of the vehicle, going on-duty or off-duty, a combination thereof.

While the data record 305 and the mapping table 355 detail vehicle/operator data and vehicle operation events, respectively, neither the data record 305 nor the mapping table 355 can provide performance data for a specific operator, or performance data for a specific vehicle over, for example, a time period. In implementations, the data record 305 and the mapping table 355 can be correlated, mapped, or otherwise processed by a processing module 348, such as, for example, the analytics manager application 210, the data module 106, or other modules and/or applications thereof. Specifically, the processing module 348 can receive the data record 305, the mapping table 355, and/or other data as inputs, process the inputted data, and output charts, tables, mappings, and/or other data that can be viewable, modifiable, and/or otherwise manipulated in different contexts, as discussed herein.

Referring to FIG. 3, exemplary output data records 375, 385 are data records that can be outputted by the processing module 348. In particular, the output data record 375 can comprise data for a specific operator (operator 1), and the output data record 385 can comprise data for a specific vehicle (vehicle 1) over a specific time frame (on Sep. 5, 2011). It should be appreciated that the data of the output data records 375, 385 are merely exemplary and can comprise different metrics, variables, and values.

The output data record 375 can detail vehicle performance data for a specific operator, across any and all vehicles that the operator has driven. For example, the mapping table 355 indicates that operator 1 drove both vehicles 1 and 2 over a two-day period. Therefore, the output data record 375 can detail the combined performance metrics associated with the operation, by operator 1, of both vehicles 1 and 2. For example, in driving both vehicles 1 and 2, operator 1 had a total of two (2) hard braking counts and one (1) driving violation.

The output data record 385 can detail performance data for a specific vehicle and over a set time period, regardless of which operator drove the vehicle. For example, the mapping table 355 indicates that both operator 1 and operator 2 drove vehicle 1 on Sep. 5, 2011. Therefore, the output data record 385 can detail the performance metrics for vehicle 1, by both operators 1 and 2, on Sep. 5, 2011. For example, vehicle 1 had an average mpg of 12.8 and a total of three (3) hard braking counts. In implementations, any of the data of the data records/mapping tables 305, 355, 375, and 385 can be updated on a real-time basis, or otherwise as data becomes available. Further, the systems and methods as described herein can create different context views associated with singular or combinations of operators, vehicles, time periods, and the like. Still further, the data of the output data records 375, 385 can dynamically update as more data is populated in the data record 305 and/or the mapping table 355. For example, if operator 1 drives an additional vehicle, then the mapping table 355 associated with operator 1 can update as operator 1 drives the additional vehicle. It should be appreciated that further updating scenarios are envisioned.

Figure 4:
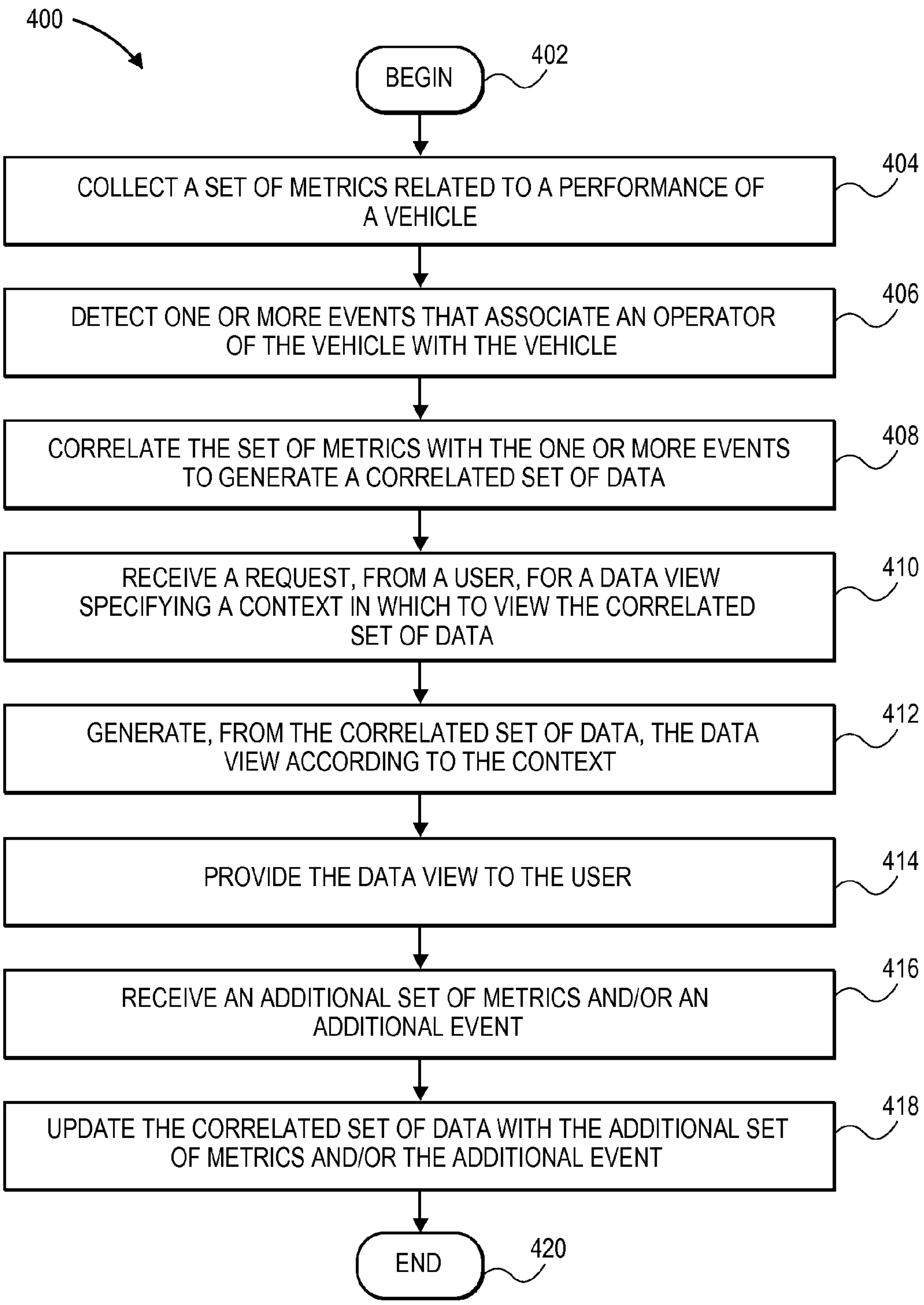
FIG. 4 is a flow diagram illustrating a process of processing vehicle data according to various implementations.

FIG. 4 illustrates a flow diagram illustrating a process 400 of generating a correlated and interchangeable set of data. In implementations, the process 400 can be performed by any logic or device on a vehicle or by any logic or device in a system, such as the network management center 102. It should be apparent to those of ordinary skill in the art that the diagram depicted in FIG. 4 represents a generalized illustration and that other processing may be added or existing processing can be removed or modified.

The process 400 begins at 402 when, for example, a system administrator, vehicle operator, or other user or entity starts a data processing routine. In 404, logic associated with the data processing routine can collect a set of metrics related to a performance of a vehicle. For example, the set of metrics can comprise any data related to the vehicle operation, such as operator safety information, operator compliance information, fuel related metrics, and the like, as well any vehicle identification information. In 406, the logic can detect one or more events that associate an operator of the vehicle with the vehicle. For example, the one or more events can comprise operator login/logout events associated with a device in the vehicle, duty status changes by the operator, and other events.

In 408, the logic can correlate the set of metrics with the one or more events to generate a correlated set of data. In implementations, the correlated set of data can comprise an overlap of the set of metrics with the events. For example, the correlated set of data can indicate which of the set of metrics are attributed to the operator when the operator was logged into the device. In 410, the logic can receive a request, from a user, for a data view specifying a context in which to view the correlated set of data. In implementations, the context can be either an operator context or an operator context. In 412, the logic can generate, from the correlated set of data, the data view according to the context. For example, if the context is an operator context, then the data view can be organized from a perspective of the operator, independent of the vehicle. For further example, if the context is a vehicle context, then the data view can be organized from a perspective of the vehicle, independent of who operated the vehicle. In 414, the logic can provide the data view to the user. In implementations, the data view can be provided via a graphical user interface (GUI) of a client machine, via a data communication, or via any other type of data display or delivery technique.

In 416, the logic can receive an additional set of metrics and/or an additional event. For example, the additional set of metrics can be related to the original vehicle, or related to an additional vehicle. Further, the additional event can associate the operator with an additional vehicle, or can associate an additional operator with the vehicle. In 418, the logic can update the correlated set of data with the additional set of metrics and/or the additional event. In implementations, if the additional set of metrics is related to a performance of an additional vehicle operated by the same operator, then the correlated set of data can be updated according to the multiple vehicle operation by the operator. In other implementations, if the additional event associates an additional operator with the same vehicle, then the correlated set of data can be updated according to combined operation of the vehicle by the multiple operators. In 420, the processing can end, repeat, or return to any of the previous steps.

In implementations, the systems and methods as described herein can allow vehicle managers, administrators, or operators to adjust driving schedules, assignments, or general operation techniques in response to data processing results. For example, if a combined data set for a particular operator over multiple vehicles indicates that the particular operator drives at a low MPG and commits a lot of hard braking events, then the vehicle manager can assign that operator to a more fuel-efficient vehicle. For further example, if a data set for a particular vehicle over a one-month span indicates that the vehicle has a low top gear usage, then the vehicle manager can schedule that vehicle for a maintenance check. It should be appreciated that the vehicle manager or other entities such as a vehicle operator can use the data processing results to make any type of changes, adjustments, or other modifications to the management or operation of one or more vehicles and/or operators.

Figure 5:
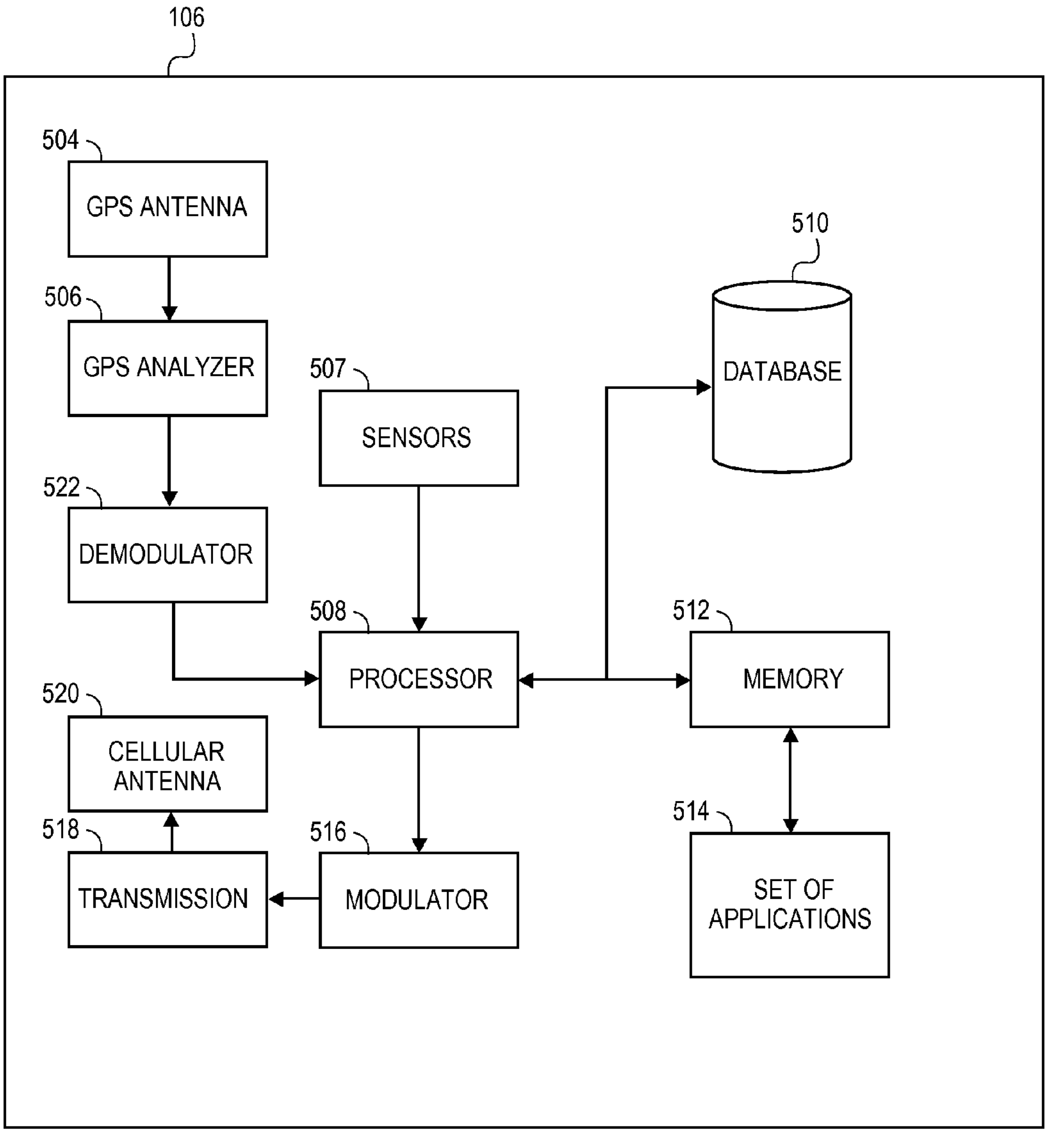
FIG. 5 illustrates an exemplary hardware configuration of a module used in processing vehicle data according to various implementations.

FIG. 5 illustrates an exemplary hardware configuration of the data module 106 or other module associated with the vehicle 105, consistent with various implementations. The data module 106 can comprise a set of sensors 507 that can be configured to sense operational data associated with the vehicle 105, as discussed herein, and provide the data to a processor 508 for processing. The data module 106 can further comprise at least one GPS antenna 504 (e.g., a transmission receiver or group of such receivers comprising an input interface) that can act as a wave guide for receipt of wireless GPS position coordinates or signals, and a GPS analyzer 506, which performs actions (e.g., filters, amplifies, down-converts, etc.) on the received signals. The GPS antenna 504 and the GPS analyzer 506 can also be coupled with a demodulator 522 that can demodulate received signals and provide them to the processor 508 for processing. The data module 106 can additionally include memory 512 that is operatively coupled to the processor 508 and that can store data to be transmitted, received, and the like.

The processor 508 can be configured to analyze information received by GPS antenna 504 and or the sensors 507 and/or a user input interface of data module 106 (not depicted), and/or generate information for transmission by a transmitter 518 via a modulator 516. The processor 508 can connect to a database 510 that can store location and vehicle operational data including, for example, MPG data, operator compliance data, operator login and logout events, and other data. Additionally, the processor 508 can control and/or reference one or more resources or components (e.g., 522, 510, 514, 516, 518) of the data module 106. Additionally, the processor 508 can execute one or more set of applications 514 or other software, modules, applications, logic, code, or the like, to perform calculations and/or processing associated with the implementations described herein.

Figure 6:
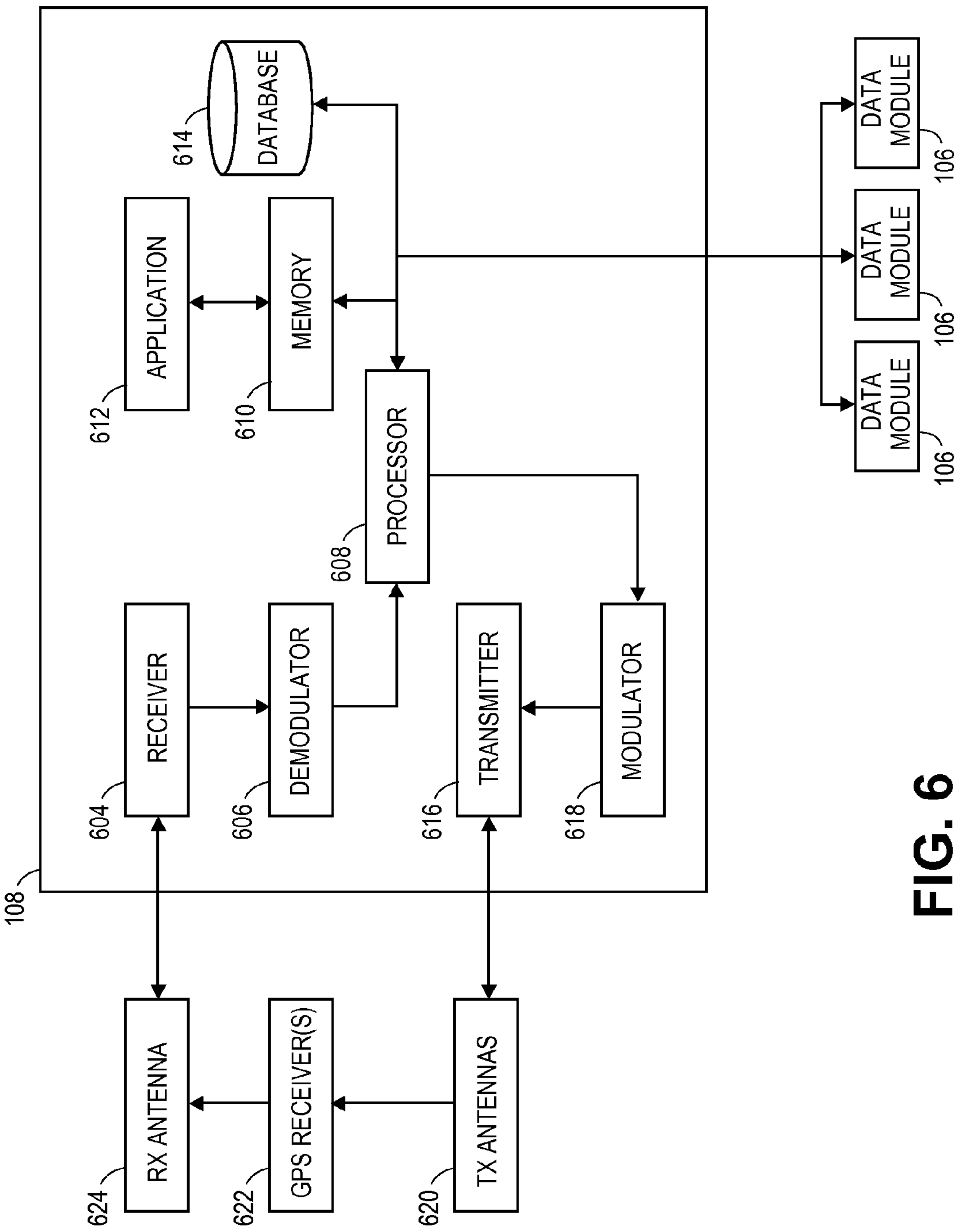
FIG. 6 illustrates an exemplary hardware configuration of a module used in processing vehicle data according to various implementations.

FIG. 6 illustrates an exemplary hardware configuration of a system including a processing module, such as the processing module 108 of the network management center 102, according to various implementations. The processing module 108 can comprise a base receiver (e.g., access point, data storage, cell tower, etc.) with a receiver 604 that can receive signal(s) from one or more GPS receivers 622, or other satellite data receivers, through one or more receive antennas 624, and a transmitter 616 that transmits to the one or more GPS receivers 622 through a transmit antenna 622. The receiver 604 can receive information from one or more receive antennas 624 and be operatively associated with a demodulator 606 that can demodulate received information.

A processor 608 can analyze demodulated signals provided by demodulator 606. The processor 608 can further couple to a modulator 618 and a memory 610 that can store one or more applications 612 that can execute, support, facilitate and/or participate in calculation and communication techniques as described in implementations contained herein. A database 614 can be coupled to the processor 608 and the memory 610 and can be configured to store location and vehicle operational data including, for example, vehicle identifications, operator efficiency metrics, operator login and logout events, and other data. The applications 612 can be configured to, for example, compute the TiTG data of vehicles using the data received sensors coupled to the vehicles, in accordance with implementations described herein. The processor 608 can be figured to provide data or notifications relating to the data to the data modules 106 over a cellular network, a satellite network, a personal area network, a local area network, a metropolitan area network, a wide area network, the Internet, an intranet, an extranet, a virtual private network, a peer-to-peer network, or a wireless self-configuring network.

The foregoing description is illustrative, and variations in configuration and implementation may occur to persons skilled in the art. For instance, the various illustrative logics, logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary implementations, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the elements described herein can also be included within the scope of computer-readable media.

The processing of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

What is claimed is:

1. A method of processing data associated with a vehicle, comprising:

receiving a set of metrics related to a performance of the vehicle and a plurality of operators of the vehicle over a set time period from an application operating on the vehicle to collect data associated with operation of the vehicle, wherein the set of metrics include compliance information of the plurality of operators of the vehicle;

identifying a plurality of events associating the plurality of operators of the vehicle with the vehicle along with associated timestamps of the plurality of events;

generating a mapping table mapping the plurality of events to times during which the plurality of operators operate the vehicle based at least in part on the associated timestamps of the plurality of events;

correlating over the set time period, by a processor, the set of metrics with the plurality of operators based at least in part on the times during which the plurality of operators operate the vehicle as specified in the mapping table to generate a correlated set of data viewable from an operator context of one of the plurality of operators, wherein the correlated set of data viewable from the operator context include the compliance information of the operator;

providing the correlated set of data to a client;

receiving an updated set of metrics, an additional event, or both;

updating the correlated set of data according to the updated set of metrics, the additional event, or both; and providing the updated correlated set of data to the client.

2. The method of claim 1, wherein providing the correlated set of data to the client comprises:

receiving a request, from the client, for a data view, wherein the data view specifies the operator context;

generating, from the correlated set of data, the data view according to the operator context; and providing the data view that was generated to the client.

3. The method of claim 1, wherein the event corresponds to at least one of the operator logging into a device of the vehicle or the operator updating a duty status.

4. The method of claim 1, wherein:

receiving the set of metrics comprises receiving the set of metrics related to the performance of a plurality of vehicles, including the vehicle, over the set time period, identifying the plurality of events comprises identifying the plurality of events for the plurality of vehicles along with the associated timestamps of the plurality of events, generating the mapping table comprises mapping the plurality of events to times during which the plurality of operators operate the plurality of vehicles based at least in part on the associated timestamps, and correlating the set of metrics comprises correlating, over the set time period, the set of metrics with the plurality of operators based at least in part on the times during which the plurality of operators operate the plurality of vehicles as specified in the mapping table to generate a correlated set of data viewable from the operator context of one of the plurality of operators.

5. The method of claim 1, wherein correlating the set of metrics comprises:

receiving an additional set of metrics related to a performance of an additional vehicle driven by the operator; and updating the correlated set of data with the additional set of metrics.

6. The method of claim 1, wherein correlating the set of metrics comprises:

identifying an additional event associating an additional operator of the vehicle with the vehicle; and updating the correlated set of data with the additional event.

7. The method of claim 1, wherein the compliance information includes at least one of driving violations, violation durations, counts and durations of on-duty violations, counts and durations of cumulative violations, or counts and durations of off-duty violations.

8. A system for processing data associated with a vehicle, comprising:

a server configured to:

receive a set of metrics related to a performance of the vehicle and a plurality of operators of the vehicle over a set time period from an application operating on the vehicle to collect data associated with operation of the vehicle, wherein the set of metrics include compliance information of the plurality of operators of the vehicle;

identify a plurality of events associating the plurality of operators of the vehicle with the vehicle along with associated timestamps of the plurality of events;

generate a mapping table mapping the plurality of events to times during which the plurality of operators operate the vehicle based at least in part on the associated timestamps of the plurality of events;

correlate, over the set time period, the set of metrics with the plurality of operators based at least in part on the times during which the plurality of operators operate the vehicle as specified in the mapping table to generate a correlated set of data viewable from an operator context of one of the plurality of operators, wherein the correlated set of data viewable from the operator context include the compliance information of the operator;

provide the correlated set of data to a client;

receive an updated set of metrics, an additional event, or both;

update the correlated set of data according to the updated set of metrics, the additional event, or both; and provide the updated correlated set of data to the client.

9. The system of claim 8, wherein the event corresponds to at least one of the operator logging into a device of the vehicle or the operator updating a duty status.

10. The system of claim 8, wherein the server is configured to provide the correlated set of data to the client at least in part by:

receiving a request, from the client, for a data view, wherein the data view specifies the operator context;

generating, from the correlated set of data, the data view according to the operator context; and providing the data view that was generated to the client.

11. The system of claim 8, wherein the server is configured to correlate the set of metrics at least in part by:

receiving an additional set of metrics related to a performance of an additional vehicle driven by the operator; and updating the correlated set of data with the additional set of metrics.

12. The system of claim 8, wherein the server is configured to correlate the set of metrics at least in part by:

identifying an additional event associating an additional operator of the vehicle with the vehicle; and updating the correlated set of data with the additional event.

13. The system of claim 8, wherein the system being configured to:

receive the set of metrics at least in part by receiving the set of metrics related to the performance of a plurality of vehicles, including the vehicle, over the set time period;

identify the plurality of events at least in part by identifying the plurality of events for the plurality of vehicles along with the associated timestamps of the plurality of events;

generate the mapping table at least in part by mapping the plurality of events to times during which the plurality of operators operate the plurality of vehicles based at least in part on the associated timestamps; and correlate the set of metrics at least in part by correlating, over the set time period, the set of metrics with the plurality of operators based at least in part on the times during which the plurality of operators operate the plurality of vehicles as specified in the mapping table to generate a correlated set of data viewable from the operator context of one of the plurality of operators.

14. A system for processing data associated with a vehicle, comprising:

means for providing a wireless interface; and means for processing the data associated with the vehicle, communicating with the means for providing a wireless interface, the means for processing being configured to:

receive a set of metrics related to a performance of the vehicle and a plurality of operators of the vehicle over a set time period from an application operating on the vehicle to collect data associated with operation of the vehicle, wherein the set of metrics include compliance information of the plurality of operators of the vehicle;

identify a plurality of events associating the plurality of operators of the vehicle with the vehicle along with associated timestamps of the plurality of events;

generate a mapping table mapping the plurality of events to times during which the plurality of operators operate the vehicle based at least in part on the associated timestamps of the plurality of events;

correlate, over the set time period, the set of metrics with the plurality of operators based at least in part on the times during which the plurality of operators operate the vehicle as specified in the mapping table to generate a correlated set of data viewable from an operator context of one of the plurality of operators, wherein the correlated set of data viewable from the operator context include the compliance information of the operator;

provide the correlated set of data to a client;

receive an updated set of metrics, an additional event, or both;

update the correlated set of data according to the updated set of metrics, the additional event, or both; and provide the updated correlated set of data to the client.

15. The system of claim 14, wherein the event corresponds to at least one of the operator logging into a device of the vehicle or the operator updating a duty status.

16. The system of claim 14, wherein the means for processing being configured to provide the correlated set of data to the client at least in part by:

receiving a request, from the client, for a data view, wherein the data view specifies the operator context;

generating, from the correlated set of data, the data view according to the operator context; and providing the data view that was generated to the client.

17. The system of claim 14, wherein the means for processing being configured to correlate the set of metrics at least in part by:

receiving an additional set of metrics related to a performance of an additional vehicle driven by the operator; and updating the correlated set of data with the additional set of metrics.

18. The system of claim 14, wherein the means for processing being configured to correlate the set of metrics at least in part by:

identifying an additional event associating an additional operator of the vehicle with the vehicle; and updating the correlated set of data with the additional event.

19. The system of claim 14, the means for processing being configured to:

receive the set of metrics at least in part by receiving the set of metrics related to the performance of a plurality of vehicles, including the vehicle, over the set time period;

identify the plurality of events at least in part by identifying the plurality of events for the plurality of vehicles along with the associated timestamps of the plurality of events;

generate the mapping table at least in part by mapping the plurality of events to times during which the plurality of operators operate the plurality of vehicles based at least in part on the associated timestamps; and correlate the set of metrics at least in part by correlating, over the set time period, the set of metrics with the plurality of operators based at least in part on the times during' which the plurality of operators operate the plurality of vehicles as specified in the mapping table to generate a correlated set of data viewable from the operator context of one of the plurality of operators.

20. A non-transitory computer-readable medium comprising:

at least one instruction for causing a computer to receive a set of metrics related to a performance of the vehicle and a plurality of operators of the vehicle over a set time period from an application operating on the vehicle to collect data associated with operation of the vehicle, wherein the set of metrics include compliance information of the plurality of operators of the vehicle;

at least one instruction for causing a computer to identify a plurality of events associating the plurality of operators of the vehicle with the vehicle along with associated timestamps of the plurality of events;

at least one instruction for generating a mapping table mapping the plurality of events to times during which the plurality of operators operate the vehicle based at least in part on the associated timestamps of the plurality of events;

at least one instruction for causing a computer to correlate, over the set time period, the set of metrics with the plurality of operators based at least in part on the times during which the plurality of operators operate the vehicle as specified in the mapping table to generate a correlated set of data viewable from an operator context of one of the plurality of operators, wherein the correlated set of data viewable from the operator context include the compliance information of the operator;

at least one instruction for causing a computer to provide the correlated set of data to a client;

at least one instruction for causing a computer to receive an updated set of metrics, an additional event, or both;

at least one instruction for causing a computer to update the correlated set of data according to the updated set of metrics, the additional event, or both; and at least one instruction for providing the updated correlated set of data to the client.

21. The computer-readable medium of claim 20, wherein the event corresponds to at least one of the operator logging into a device of the vehicle or the operator updating a duty status.

22. The computer-readable medium of claim 20, wherein the at least one instruction for providing provides the correlated set of data to the client at least in part by:

receiving a request, from the client, for a data view, wherein the data view specifies the operator context;

generating, from the correlated set of data, the data view according to the operator context; and providing the data view that was generated to the client.

23. The computer-readable medium of claim 20, wherein the at least one instruction for correlating correlates the set of metrics at least in part by:

receiving an additional set of metrics related to a performance of an additional vehicle driven by the operator; and updating the correlated set of data with the additional set of metrics.

24. The computer-readable medium of claim 20, wherein the at least one instruction for correlating correlates the set of metrics at least in part by:

identifying an additional event associating an additional operator of the vehicle with the vehicle; and updating the correlated set of data with the additional event.

25. The computer-readable medium of claim 20, wherein:

the at least one instruction for receiving the set of metrics receives the set of metrics related to the performance of a plurality of vehicles, including the vehicle, over the set time period, the at least one instruction for identifying the plurality of events identifies the plurality of events for the plurality of vehicles along with the associated timestamps of the plurality of events, the at least one instruction for generating the mapping table maps the plurality of events to times during which the plurality of operators operate the plurality of vehicles based at least in part on the associated timestamps, and the at least one instruction for correlating the set of metrics correlates, over the set time period, the set of metrics with the plurality of operators based at least in part on the times during which the plurality of operators operate the plurality of vehicles as specified in the mapping table to generate a correlated set of data viewable from the operator context of one of the plurality of operators.

* * * * *